June 11, 1957     D. P. ECKMAN ET AL     2,795,239
CONTROL APPARATUS
Original Filed Nov. 14, 1947
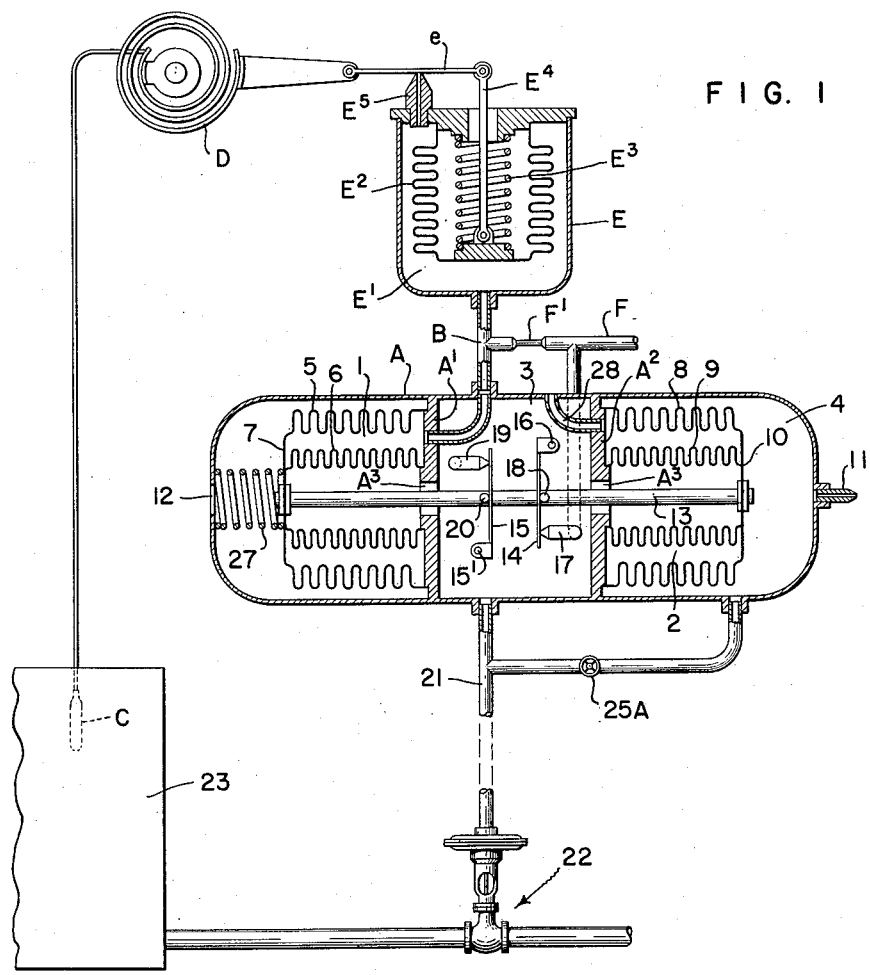
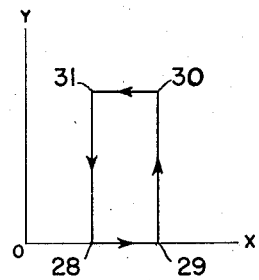
INVENTORS.
DONALD P. ECKMAN
JOSEPH G. HORN
BY
ATTORNEY.

United States Patent Office 2,795,239
Patented June 11, 1957

2,795,239
CONTROL APPARATUS

Donald P. Eckman, Ithaca, N. Y., and Joseph G. Horn, Drexel Hill, Pa., assignors, by mesne assignments, to Minneapolis-Honeywell Regulator Company, Minneapolis, Minn., a corporation of Delaware Original application November 14, 1947, Serial No. 785,990, now Patent No. 2,675,819, dated April 20, 1954. Divided and this application September 1, 1953, Serial No. 380,202

3 Claims. (Cl. 137—620)

The general object of the present invention is to provide an improved air controller operative to effect two position control with an adjustable differential gap. More specifically, the object of the invention is to provide an air controller operative as described and of the type in which a null balance, pilot valve mechanism is built into the controller and is actuated by the resultant of forces due to the different air pressures acting on the movable walls of a plurality of separate expansible pressure chambers included in the controller. A primary object of the present invention is to extend the field of use of air controllers of the above type by a relatively simple and practically effective combination in the two position controller of a sufficient number of pressure chambers having movable walls to give the air controller novel and practically important characteristics and to enable it to produce advantageous results not obtainable with prior apparatus of the same general type, or of similar simplicity and effectiveness.

A more specific object of the invention is to provide an air controller of the above mentioned type, including a novel, mechanically simple, and effective combination of at least four expansible pressure chambers, each having a movable wall, with mechanism for regulating the relative pressures in said chambers and utilizing those pressures in producing two position control with adjustable differential gap regulation action. The present application is a division of our prior application, Serial No. 785,990, filed November 14, 1947, issued April 20, 1954 as Patent 2,675,819.

The various features of novelty which characterize our invention are pointed out with particularity in the claims annexed to and forming a part of this specification. For a better understanding of the invention, however, its advantages, and specific objects attained with its use, reference should be had to the accompanying drawings and descriptive matter in which we have illustrated and described a preferred embodiment of the invention.

Of the drawings:

Fig. 1 is a somewhat diagrammatic view of an air controller unit for effecting two position control with a differential gap regulation; and Fig. 2 is a diagram illustrating the differential gap regulation attainable with the apparatus shown in Fig. 1.

In Fig. 1 we have illustrated a form of our invention adapted for use as a two position air controller A with an adjustable differential gap, i. e., with an adjustable difference between the value of the controlled variable at which the controller output pressure is abruptly reduced to equality with the pressure of the atmosphere, and the lower value of the controlled variable at which the output pressure is abruptly increased to approximate equality with the air pressure in a compressed air supply pipe F.

As shown by way of illustration and example in Fig. 1, the controlled variable is a temperature to which a fluid pressure thermometer bulb C is exposed. The bulb pressure is transmitted to a Bourdon tube D, which adjusts the control valve $e$ of a pneumatic relay or transmitter E of a well known form having a pressure chamber E'.

The chamber E' is connected to the previously mentioned compressed air supply pipe F, through a portion of the pipe B and a restricted passage F'. A portion of the wall of the chamber E' is formed by a bellows element $E^2$ subjected to a collapsing force by the air in the chamber. Said collapsing force is opposed by a bias or measuring or calibrated spring $E^3$, so that the varying length of the bellows element is a measure of the varying pressure in the chamber E'. The movable end of the bellows element $E^2$ is connected by a link $E^4$ to the valve $e$ to give the latter follow-up adjustments on changes in the pressure in the chamber E'. The link $E^4$ and Bourdon tube D jointly adjust the valve $e$ to proportion the air pressure in the chamber E' to the temperature of the bulb C, by variably throttling the escape of air from the chamber E' to the atmosphere through a bleed nozzle $E^5$.

In Fig. 1, A designates the air controller unit proper. That unit comprises a housing or casing body structure having stationary and movable internal partitions which form four expansible pressure chambers 1, 2, 3, and 4. The two stationary internal partitions are parallel, spaced apart elements A' and $A^2$, formed with registering central apertures $A^3$. The expansible chamber 1 is at the left hand side of the stationary partition A', and comprises the annular space between outer and inner tubular corrugated bellows elements 5 and 6, each coaxial with the registering openings $A^3$, and is referred to herein as the input chamber. The left ends of the bellows elements 5 and 6 are attached to a common movable end wall member 7.

The expansible chamber 2 is at the right of the stationary partition member $A^2$ and comprises the annular space between outer and inner tubular bellows elements 8 and 9, each of which has its left end attached to the stationary partition $A^2$ and has its right hand end connected to a common movable end wall member 10. Expansible chamber 2 is referred to herein as the third chamber. For a purpose hereinafter explained, the bellows element 9 is of larger diameter than the bellows element 6.

The expansible chamber 3 comprises the fixed spaces surrounded by the inner bellows elements 6 and 9, respectively, and is referred to herein as the output chamber. The expansible chamber 4 comprises the space at the right of the partition $A^2$ between the controller housing structure A and the movable internal partition wall formed by the bellows element 8 and end wall member 10. Expansible chamber 4 is referred to herein as the fourth chamber. The chamber 4 is in restricted communication with the atmosphere through a bleed orifice 11. While the housing structure of the controller A advantageously extends about and forms a protective enclosure for the bellows element 5 and end wall member 7, the space between the casing and the last mentioned wall and member is in free communication with the external atmosphere through a port or ports 12.

The end wall members 7 and 10 are connected to move together by a cross-bar or connecting rod 13 coaxial with said end walls and partition openings $A^3$, and extending through the latter. The axial movements of the rod 13 control the pressure in the chamber 3 and so relate that pressure to the pressures in the chambers 1, 2, and 4 as to normally maintain the rod in a predetermined normal position.

The rod 13 regulates the pressure in the chamber 3 by giving an opening adjustment to a normally closed supply valve 14 when the rod is displaced to the left from its normal position, and by giving an opening adjustment to a normally closed vent valve 15 when the rod is displaced to the right from its normal position. The valve 14, as shown, is a flapper type valve pivoted at 16 and biased for turning movement into the position in which it engages a supply nozzle 17 and closes the discharge orifice thereof. The nozzle 17 extends into the chamber 3 through the controller housing body, and is connected externally of the latter to the compressed air supply pipe F. When the rod 13 moves to the left from its normal position, a projection 18 carried by said cross-bar engages the valve 14 and moves it out of engagement with the nozzle 17, and the latter then discharges air into the chamber 3 and increases the pressure therein. The flapper type valve 15 is pivoted at 15' and is biased for movement into a position in which it engages a vent pipe 19 and closes the inner end of the vent passage in said pipe. The vent passage is open at its outer end to the external atmosphere. On movement of the cross-bar 13 to the right from its normal position, a projection 20 from the rod engages the valve 15 and moves the latter out of engagement with the vent pipe so as to open the vent passage therein and thereby reduce the air pressure in the chamber 3.

The controller output pressure maintained in the chamber 3, is transmitted through the output pipe 21 to the pressure chamber of the final control element 22 of the control system. As diagrammatically shown by way of example, the final control element 22 is a regulator in the form of a fluid pressure actuated fuel valve, regulating the supply of fuel to a heater 23, to the temperature in which the thermometer bulb C is responsive. In the arrangement shown in Fig. 1, the valve 22 is spring biased to its open position, and the pressure transmitted from the chamber 3 to the valve 22 closes the latter to an extent varying with said pressure. A bias spring 27 shown as a compression spring arranged to act between the end wall 7 and the adjacent end of the controller housing A, provides a bias force action on the rod 13. That action is needed to hold the rod 13 far enough to the right to maintain the inlet valve 14 in its closed position at times when the only fluid presure opposing movement of the rod to the left is equal to the pressure of the atmosphere, and in which the value of the input pressure is lower than the desired maximum required for the attainment of the required differential gap. The bias force supplied by the spring 27 may be supplied in other ways. For example, it may be supplied in whole or in part by the natural resiliency of the various bellows elements 5, 6, 8, and 9 when the latter are made of thin resilient metal, as is customary, and are arranged as to be under a tension opposing movement of the rod 13 to the left from the position which permits the valve 14 to close.

The character of the operation of the apparatus shown in Fig. 1 depends upon the adjustment of the valve 25A which connects the output pipe 21 to the chamber 4 of the controller A. The valve 25A of Fig. 1 may be structurally identical with a throttling range control valve 25 included in a controller giving proportional and rate responses disclosed in our above mentioned application, Serial No. 785,990, issued April 20, 1954, as Patent 2,675,819. However, in the combination disclosed herein, the valve 25A serves the special purpose of regulating the differential gap action of the controller A. It is to be noted, however, that a differential gap results from a negative follow-up action, and a large subsequent positive follow-up action.

As used herein, the term "negative follow-up action," means an adjustment of the rod 13 in one direction which is caused by a preceding adjustment of the rod 13 in the opposite direction resulting from and produced by a change in the pressure transmitted to the chamber 1; and a "positive follow-up action" is one which affects an adjustment of the rod 13 in the same direction as the preceding adjustment of the rod 13 produced by a change in the pressure in the chamber 1.

When the differential gap valve 25A is partly open, an increase in the input pressure which moves the rod 13 to the left and opens the valve 14, increases the pressure in the chamber 3 and thereby causes a movement of the rod 13 to the right as a result of the fact that the diameter of the bellows 9 exceeds the diameter of the bellows 6. The adjustment of the rod 13 to the right gives a closing adjustment to the valve 14 and is a "negative follow-up action." The increase in the pressure in the chamber 3 resulting from the initial adjustment of the rod 13 to the left causes a flow of air through the valve 25A into the chamber 4 and increases the pressure in the last mentioned chamber. The pressure increase in the chamber 4 occurs somewhat more slowly than the pressure increase in the chamber 3, and results in an adjustment of the rod 13 to the left. The last mentioned adjustment of the rod 13 is a "positive follow-up action" and directly results from the fact that the pressure increase in the chamber 4 acts against the entire area of the bellows end wall 10, whereas the increase in pressure in the chamber 3 operates effectively only on a relatively small portion of the area of the end wall 10.

The overall result of the initial adjustment of the rod 13 to the left and the subsequent adjustment of the rod in the same direction produced by the "positive follow-up action," is to increase the pressure in the chamber 3 to equality with the pressure in the supply pipe F. The maximum pressure in the chamber 3 thus established results in the closure of the valve 22 and a subsequent reduction in the temperature of the bulb C. When the closure of the valve 22 has caused a reduction in the bulb temperature which produces a sufficient reduction in the pressure in the input chamber 1, the rod 13 is moved to the right and gives an opening adjustment to the valve 15. The resultant reduction in the pressure in the chamber 3 below the pressure in the chamber 4, produces a movement of the rod 13 to the left. The last mentioned rod movement is a "negative follow-up action" moving the rod 13 to the right, and resulting from the reduction in the pressure in the chamber 4 due to the flow of air from the chamber 4 into the chamber 3 through the differential gap valve 25A.

When the valve 25A is fully closed, there is no significant "positive follow-up action," and no significant differential gap is then attainable. The rod 13 can then occupy its normal position in which the flapper valves 14 and 15 are both closed only when the thrust against the end wall 7 of the input pressure in the chamber 1 balances the sum of the force due to the bias spring 27 and the net thrust force to the right of the pressure in the chamber 3 which acts against a portion of the end wall 7 and against a larger portion of the end wall 10. This balanced condition of the apparatus may be attained only momentarily at the instant at which the pressure in the chamber 3 is rapidly changing between its maximum and minimum values, and the opening of either of the valves 14 or 15 then quickly creates a pressure condition causing the other valve to open. With the valve 25A closed, the controller A thus operates to effect simple on-off control.

Owing to the relative areas of the portions of the end walls 7 and 10 on which the output pressure and chamber 4 pressure act respectively, the magnitude of the positive follow-up action exceeds that of the negative follow-up action by a significant amount when the valve 25A is suitably adjusted. In consequence of such positive follow-up adjustment, the input pressure in the chamber 1 must be substantially higher when it opens the inlet valve 14, than when it opens the vent valve 15. This differential gap between the inlet and outlet valve opening pressures may be varied by adjustment of the valve 25A.

The character of the operation of the air controller A with the valve 25A partly open, is diagrammatically illustrated in Fig. 2, wherein vertical displacements from the horizontal axis OX represent output pressures in the controller chamber 3 and pipe 21, and horizontal displacements from the vertical axis OY represent input pressures transmitted to the chamber 1 by the pipe B. The rectangular figure 28, 29, 30, and 31 of Fig. 2, illustrates the variations in the output and input pressures occurring in a normal cycle of operation with the particular throttling adjustment of the valve 25A required for the differential gap represented by the horizontal displacement of the line 31—28 from the line 29—30 shown in Fig. 2.

It may be assumed, for example, that the cycle of operation starts when the output and input pressures, i. e., the pressures in chambers 3 and 1, respectively, attain their respective values represented by the point 28. Those values have been attained as a result of a previous movement of the rod 13 to the right which has opened the vent valve 15 and reduced the output pressure in the chamber 3 to equality with the pressure of the atmosphere. That movement of the rod 13 has resulted from the reduction of the input pressure to its minimum value indicated by the displacement of the point 31 from the line OY. The reduction of the output pressure to its minimum value, indicated by the point 28, causes fuel to be supplied through the regulator valve 22 at the maximum rate. In consequence, during the first stage of the cycle, assumed to start at the point 28, the thermometer bulb temperature increases until the input pressure in the chamber 1 is increased from its minimum value represented by the point 28, to its maximum represented by the point 29. The increase in the input pressure to the value represented by the point 29 neutralizes the effect of the excess of the positive follow-up action over the negative follow-up action resulting from the previous reduction of the output pressure to equality with the pressure of the atmosphere. In consequence, when the input pressure attains its point 29 value it moves the rod 13 to the left and opens the inlet valve 14.

When the valve 14 is thus opened, the output pressure almost instantly builds up to its maximum value indicated by the point 30. This abrupt increase in the output pressure actuates the regulator valve 22 to cut off the supply of fuel and thus initiates a reduction in the thermometer bulb temperature and input pressure applied to the chamber 1. It also results in a negative follow-up action and in a greater positive follow-up action. In consequence, during the third stage of the cycle, the input pressure must fall to the value represented by the point 31 before it permits the movement of the rod 13 to the right required to open the vent valve 15. The opening of the vent valve results in the abrupt decrease in the output pressure from its point 31 value to its point 28 value and thus completes the operation cycle illustrated in Fig. 2.

Our invention in the form illustrated and hereinbefore described, is characterized by the simple and effective manner in which a multiplicity of movable pressure walls are combined to form the simple and effective controller for producing two position control with an adjustable differential gap, which has not heretofore been produced by apparatus of similar type or character, or of similar simplicity and effectiveness. As will be apparent to those skilled in the art, the input pressure in the pipe B and the output pressure in the pipe 21 of the controller A, may, or may not, be respectively derived from a thermometer bulb temperature and utilized to adjust a flow regulator valve as in Fig. 1. Novel features of the structure shown in Fig. 1 not claimed herein, are claimed in our above mentioned application, Serial No. 785,990, issued April 20, 1954, as Patent 2,675,819, of which the present application is a division.

While, in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims, and that in some cases certain features of our invention may be used to advantage without a corresponding use of other features.

Having now described our invention, what we claim as new and desire to secure by Letters Patent, is:

1. An air controller for effecting two position control with an adjustable differential gap, comprising a casing body and stationary partition walls and movable partition walls forming separate input, output, third and fourth pressure chambers, each of which chambers has a movable wall portion formed by one of said walls, means for maintaining an input pressure in said input chamber which varies in accordance with changes in a controlled variable, valve means adapted when adjusted in one direction or in the opposite direction to respectively admit air under pressure or to vent air from said output chamber, movable valve operating means located in said output chamber and connected to each of said movable wall portions and actuated by movements of the latter to adjust said valve means in said one or in said opposite direction depending on the directions of said wall movements to thereby maintain an output pressure in said output chamber dependent on the pressures in all of said chambers, means for maintaining atmospheric pressure in said third chamber, and means providing a restricted conduit connection between said output and fourth chambers.

2. An air controller as specified in claim 1, in which the said means providing a restricted conduit connection between said output and fourth chambers includes a throttling valve, and in which said controller includes a restricted passage through which said fourth chamber is in communication with the atmosphere.

3. An air controller for effecting two position control with an adjustable differential gap, comprising a casing, four substantially coaxial tubular bellows elements arranged in spaced apart pairs within said casing, each of said pairs comprising a smaller inner element and a larger outer element, a pair of side-by-side spaced-apart stationary partitions interposed between the two pairs of bellows elements and each connected to the fixed ends of the adjacent pair of elements, a pair of movable end members each connecting the opposite ends of each pair of elements, the annular space between the elements of one pair forming an input pressure chamber, the annular space between the elements of the other pair forming a third pressure chamber, each of said partitions having an aperture through which the space between the partitions is in communication with the space surrounded by the inner element attached to the partition, means for maintaining an input pressure in said input chamber varying in accordance with variations in a controlled variable, said casing uniting with said partitions and bellows elements and end members to form said output pressure chamber including the space between said partitions and the space surrounded by each of the two inner bellows elements, and to form a fourth pressure chamber enveloping the bellows element surrounding the third pressure chamber and the end member at the movable end thereof, a rod extending through said apertures and connected at each end to the adjacent end member, valve means actuated by said rod to admit air under pressure to or to discharge air from said output chamber on a movement of said rod in the longitudinal direction in which an increase or decrease in the input pressure tends to move it, means for maintaining a predetermined relation between the output pressure and the pressures in each of said third and fourth pressure chambers, including an unrestricted passage through which said third chamber is in communication with the atmosphere, and a restricted passage through which said fourth chamber is in communication with the atmosphere.

References Cited in the file of this patent
UNITED STATES PATENTS 2,286,282   Joesting _____ June 16, 1942
2,588,839   Horn _____ Mar. 11, 1952